United States Patent
Goldsberry et al.

(10) Patent No.: US 10,144,378 B2
(45) Date of Patent: Dec. 4, 2018

(54) VEHICLE AIR DAM STRUCTURE, AND METHODS OF USE AND MANUFACTURE THEREOF

(71) Applicant: Honda Motor Co., Ltd., Tokyo (JP)

(72) Inventors: Nicholas H. Goldsberry, Hilliard, OH (US); Steve Faria, Marysville, OH (US); Ann M. Boh, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 15/195,700

(22) Filed: Jun. 28, 2016

(65) Prior Publication Data

US 2017/0369014 A1    Dec. 28, 2017

(51) Int. Cl.
| | | |
|---|---|---|
| *B60R 19/52* | (2006.01) | |
| *B60K 11/08* | (2006.01) | |
| *B62D 35/00* | (2006.01) | |
| *B60K 11/02* | (2006.01) | |
| *B60K 13/02* | (2006.01) | |

(52) U.S. Cl.
CPC .............. *B60R 19/52* (2013.01); *B60K 11/02* (2013.01); *B60K 11/08* (2013.01); *B60K 13/02* (2013.01); *B62D 35/00* (2013.01); *B60R 2019/527* (2013.01); *B60Y 2306/09* (2013.01)

(58) Field of Classification Search
CPC ... B60R 19/52; B60R 2019/527; B60K 11/08; B60Y 2306/09; B62D 35/00
USPC .................... 296/193.1, 180.1; 293/115, 122
See application file for complete search history.

(56) References Cited

U.S. PATENT DOCUMENTS

| | | | | |
|---|---|---|---|---|
| 2,193,229 | A * | 3/1940 | Exner ..................... | B60R 19/48 180/68.1 |
| 6,405,819 | B1 * | 6/2002 | Ohkura .................. | B60K 11/08 180/68.1 |
| 6,470,700 | B1 | 10/2002 | Qiu et al. | |
| 6,918,456 | B2 * | 7/2005 | Dennison ............... | B60K 11/08 180/68.1 |
| 6,921,117 | B2 * | 7/2005 | Rackham ................ | B60R 19/52 293/115 |
| 7,950,730 | B2 | 5/2011 | Usoro et al. | |
| 8,128,158 | B1 * | 3/2012 | Davis ..................... | B60K 11/08 181/224 |
| 8,307,932 | B2 * | 11/2012 | Steller ................... | B60R 19/48 180/68.1 |

(Continued)

FOREIGN PATENT DOCUMENTS

| | | |
|---|---|---|
| JP | 4505829 B2 | 7/2010 |
| JP | 2014151750 A | 8/2014 |

*Primary Examiner* — Jason S Morrow
*Assistant Examiner* — E Turner Hicks
(74) *Attorney, Agent, or Firm* — Kenealy Vaidya LLP

(57) ABSTRACT

Some embodiments are directed to a crossbar structure for use with a vehicle having a front bumper assembly, the crossbar structure being configured to extend across an opening in the front bumper assembly. The crossbar structure can include a hollow bar defining a front face and a rear face, the hollow bar being configured to extend across the opening. The crossbar structure can also include ribs extending between opposing interior surfaces of the hollow bar, the ribs being formed in a zig-zag pattern along a direction of elongation of the hollow bar and exposed from the rear face thereof.

20 Claims, 10 Drawing Sheets

(56) References Cited

U.S. PATENT DOCUMENTS 8,348,312 B2 1/2013 Bailey
2014/0014436 A1 1/2014 Nguyen et al.

\* cited by examiner

VEHICLE AIR DAM STRUCTURE, AND METHODS OF USE AND MANUFACTURE THEREOF

BACKGROUND

The disclosed subject matter relates to a vehicle air dam structure, and methods of use and manufacture thereof. More particularly, the disclosed subject matter relates to methods and apparatus that enhance airflow through exterior intake assemblies in vehicles.

Many types of vehicles include exterior intakes, which facilitate passage of airflow from outside the vehicles into and around the vehicles, such as for aerodynamic and cooling purposes. However, exterior intakes of vehicles may include relatively large inlet openings in structural components of the vehicle for passage of airflow therethrough. These inlet openings can cause decreased structural support and rigidity in respective components, such as front and rear bumpers, hood, roof, front and rear fenders, doors, mirrors, pillars, side sills, etc. This decreased structural support can be influenced by a variety of factors, including implementation of crossbars extending across inlet openings configured to enhance structural support of the exterior intakes.

SUMMARY

However, various aerodynamic considerations and aesthetic design factors may make it challenging to reinforce exterior intakes of vehicles with crossbars. For example, structural considerations for exterior intakes may make it beneficial to provide a plurality of relatively thin and hollow crossbars that facilitate passage of airflow into the intake. These crossbars can be structurally weak and deflect airflow in a manner so as to contribute to whistling sounds when airflow enters intakes. As a result, performance of the vehicle, specifically structural integrity of the exterior intakes, can be impeded should damage or breaking of crossbars occur. Furthermore, whistling sounds may negatively affect operators and/or passengers of the vehicle, as well as bystanders outside the vehicle during operation.

It may therefore be beneficial to provide a vehicle air dam structure, and methods of use and manufacture thereof, that address at least one of the above and/or other challenges of related art vehicles. In particular, it may be beneficial to enhance exterior intake crossbar rigidity and aeroacoustics, such as by providing reinforced crossbars with aerodynamic braces extending therein. For example, the crossbar structures can have alternating, angled ribs extending through interiors thereof, the ribs being disposed relatively flush within the crossbar interiors so as to enhance aeroacoustics and aesthetics of the crossbars.

In some of these and/or other embodiments, the vehicle air dam structure can be configured to include crossbars having ribs configured as braces extending therethrough. In some of these and/or other embodiments, the ribs can be alternating and angled within interiors of the crossbars, thereby enhancing structural rigidity of the crossbars while enhancing airflow over the crossbars. In some of these and/or other embodiments, the ribs can be configured so as to have rear edges disposed proximate a rear face of the corresponding crossbar, thereby enhancing aeroacoustics and aesthetics thereof.

Some embodiments are therefore directed to a crossbar structure for use with a vehicle having a front bumper assembly, the crossbar structure being configured to extend across an opening in the front bumper assembly. The crossbar structure can include a hollow bar defining a front face and a rear face, the hollow bar being configured to extend across the opening. The crossbar structure can also include ribs extending between opposing interior surfaces of the hollow bar, the ribs being formed in a zig-zag pattern along a direction of elongation of the hollow bar and exposed from the rear face thereof.

Some other embodiments are directed to a front bumper assembly of a vehicle. The front bumper assembly can include at least one opening configured as an exterior intake to accept passage of airflow therethrough. The front bumper assembly can also include at least one crossbar structure extending across the opening. The at least one crossbar structure can include a hollow bar defining a front face and a rear face, the hollow bar being configured to extend across the opening. The at least one crossbar structure can also include ribs extending between opposing interior surfaces of the hollow bar, the ribs being formed in a zig-zag pattern along a direction of elongation of the hollow bar and exposed from the rear face thereof.

Still other embodiments are directed to a method of forming a crossbar structure for use with a vehicle having a front bumper assembly, the crossbar structure being configured to extend across an opening in the front bumper assembly, the method including: providing a hollow bar defining a front face and a rear face; configuring the hollow bar to extend across the opening; and forming ribs to extend between opposing interior surfaces of the hollow bar in a zig-zag pattern along a direction of elongation of the hollow bar so as to be exposed from the rear face thereof.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
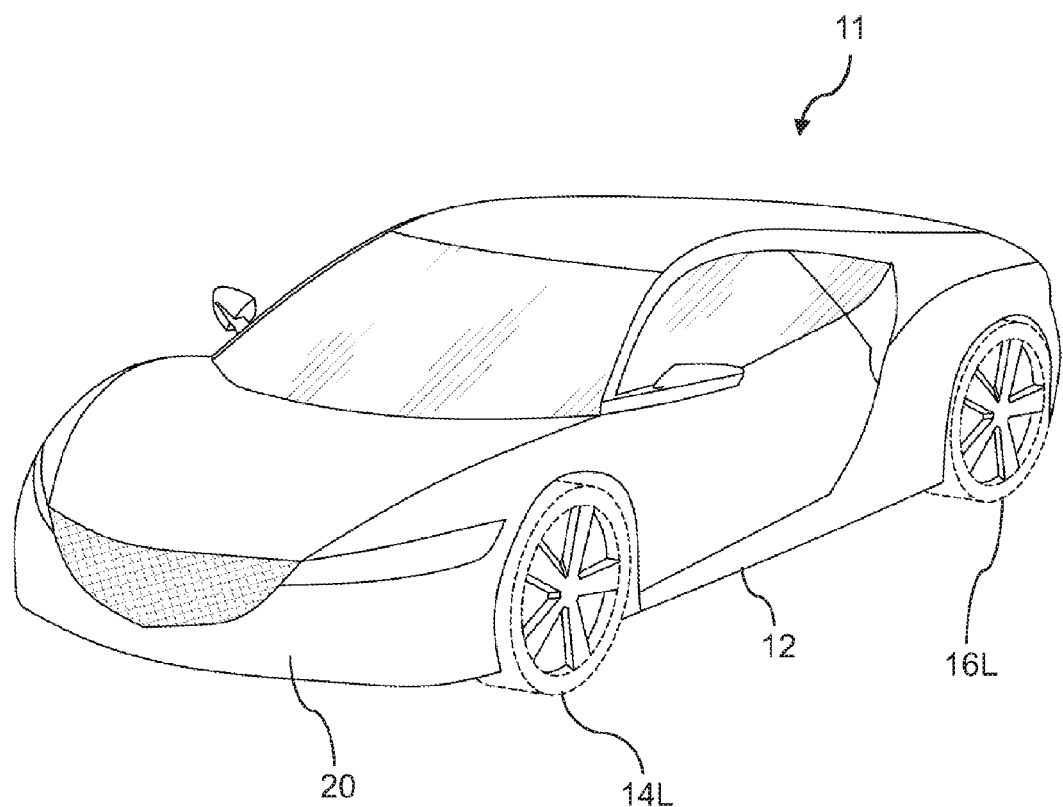
FIG. 1 is a perspective view of an exemplary vehicle having a front bumper assembly in according with the disclosed subject matter.

FIG. 1 is a perspective view of an exemplary vehicle 11 having a front bumper assembly 20 in according with the disclosed subject matter. The vehicle 11 shown in FIG. 1 is primarily for use on paved roadways, and can be referred to as a passenger vehicle. Specifically, the vehicle 11 shown in FIG. 1 is a high-performance vehicle. The vehicle 11 may also be for use on unpaved roadways consisting of gravel, dirt, sand, etc.

However, the disclosed exterior intake crossbar(s) of the front bumper assembly 20 can be used with any vehicle that is configured for travel along any one or combination of improved, unimproved, and unmarked roadways and paths consisting of gravel, dirt, sand, etc. For example, embodiments are intended to include or otherwise cover any type of automobile, including passenger car, racecar, minivan, truck, etc. In fact, embodiments are intended to include or otherwise cover configurations of the exterior intake crossbar(s) for use on other body panels and in any other type of vehicle, such as an aircraft, boat, ship, train, etc.

The vehicle 11 can include a body 12, a pair of front wheels 14L,R (the right-side front wheel is obstructed from view), a pair of rear wheels 16L,R (the right-side rear wheel is obstructed from view), the front bumper assembly 20, a frame assembly, and a powertrain. The frame assembly and the powertrain are omitted from FIG. 1 for simplicity and clarity of the drawings.

The front bumper assembly 20 of the vehicle 11 shown in FIG. 1 is configured to be disposed at a front of the vehicle 11 along a forward direction of travel. The front bumper assembly 20 is thereby configured to be contacted by airflow when the vehicle 11 is traveling in the forward direction of travel.

II. Front Bumper Assembly

Figure 2:
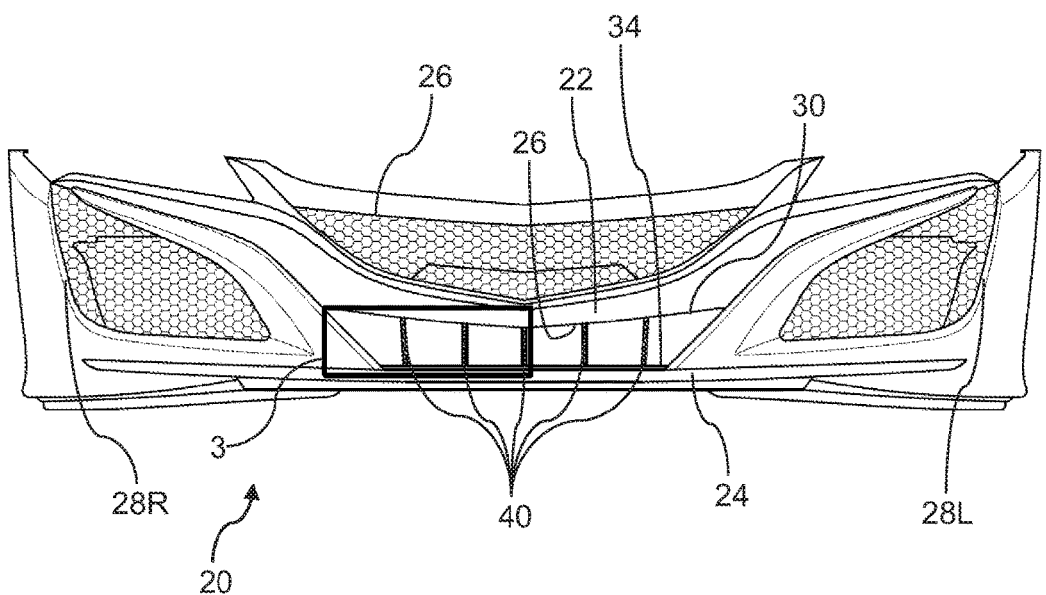
FIG. 2 is a front view of the exemplary front bumper assembly in accordance with the disclosed subject matter.

FIG. 2 is a front view of the exemplary front bumper assembly 20 in accordance with the disclosed subject matter. The front bumper assembly 20 shown in FIG. 2 can be configured to have an upper bumper portion 22 proximate a hood and headlights, and a lower bumper portion 24 extending along a lower part thereof. The front bumper assembly 20 can also include a central vent 26 and side vents 28L,R, the vents configured as airflow intakes. The intake vents can be configured to direct airflow through the vehicle 11 to enhance aerodynamics and/or to supply airflow to various components such as a radiator, intercooler, etc. As will be described below, the front bumper assembly 20 can further include an air dam 30 disposed between the upper and lower bumper portions 22,24, the air dam 30 configured as an additional vent or intake functioning as described above.

In the present embodiment, the central vent 26 and the side vents 28L,R have covers to prevent intrusion of foreign objects into the respective intake openings. The covers can be metal, plastic, carbon fiber, etc. and may be configured in a variety of mesh patterns. The air dam 30, however, may be configured without a mesh cover. Instead, the air dam 30 can have a plurality of upright crossbar structures 40 extending between upper and lower dam portions 32,34. The crossbar structures 40 can be approximately vertical within the air dam 30 and serve as braces between the upper and lower dam portions 32,34 to provide structural rigidity and partitioning of the air dam 30 openings, as well as providing enhanced aesthetics of the front bumper assembly 20.

In the present embodiment, the front bumper assembly 20 can include five of the crossbar structures 20 extending across the air dam 30, however any appropriate number of crossbar structures 20 may be implemented, such as one, two, three, four, etc. Furthermore, the crossbar structures 40 of the present embodiment are approximately evenly spaced from each other. Other embodiments may nevertheless include crossbar structures 40 unevenly spaced from each other.

Figure 3:
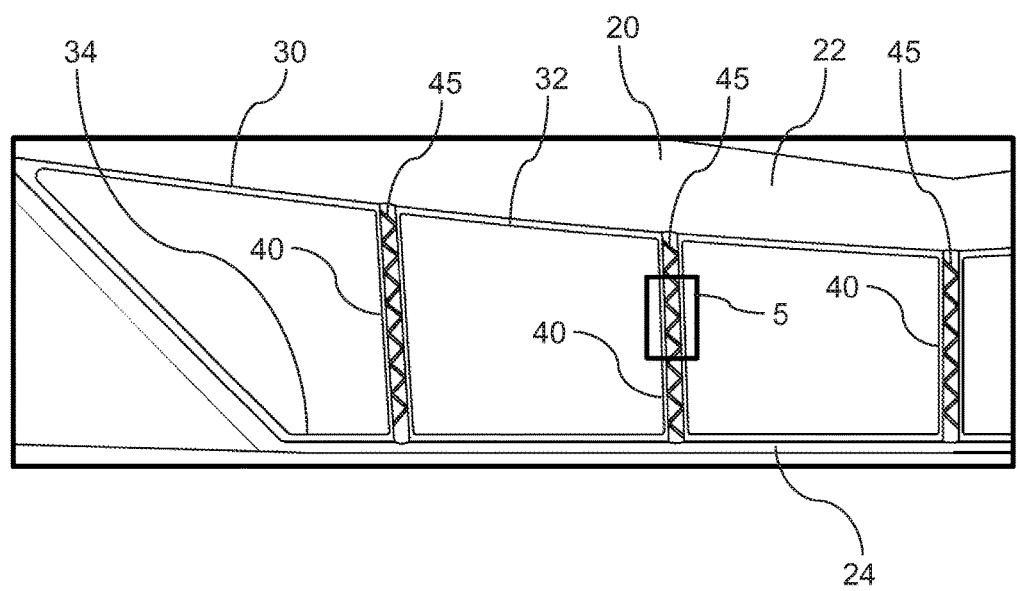
FIG. 3 is a rear view of exemplary crossbars of the front bumper assembly of FIG. 2.

FIG. 3 is a rear view of exemplary crossbar structures 40 of the front bumper assembly 20 of FIG. 2. As described above, the crossbar structures 40 can be configured as upright braces extending between the upper and lower dam portions 32,34 such that the crossbar structures 40 are approximately vertical. However, the crossbar structures 40 of other embodiments may extend so as to be angled from the upper and lower dam portions 32,34 such that the crossbar structures 40 are not vertical.

As will be described below, the crossbar structures 40 of the present embodiment may be hollow. Furthermore, the hollow portions of the respective crossbar structures 40 may have ribs 45 extending therein. In some embodiments, the ribs 45 may be alternating and angled along respective crossbar inner surfaces 42 in a direction of elongation of the crossbar structure 40 so as to form a zig-zag pattern. The ribs 45 may serve to enhance structural rigidity of the crossbar structures 40 and thus the air dam 30, while additionally disrupting airflow across the crossbar structures 40 to enhance aeroacoustics.

Figure 4:
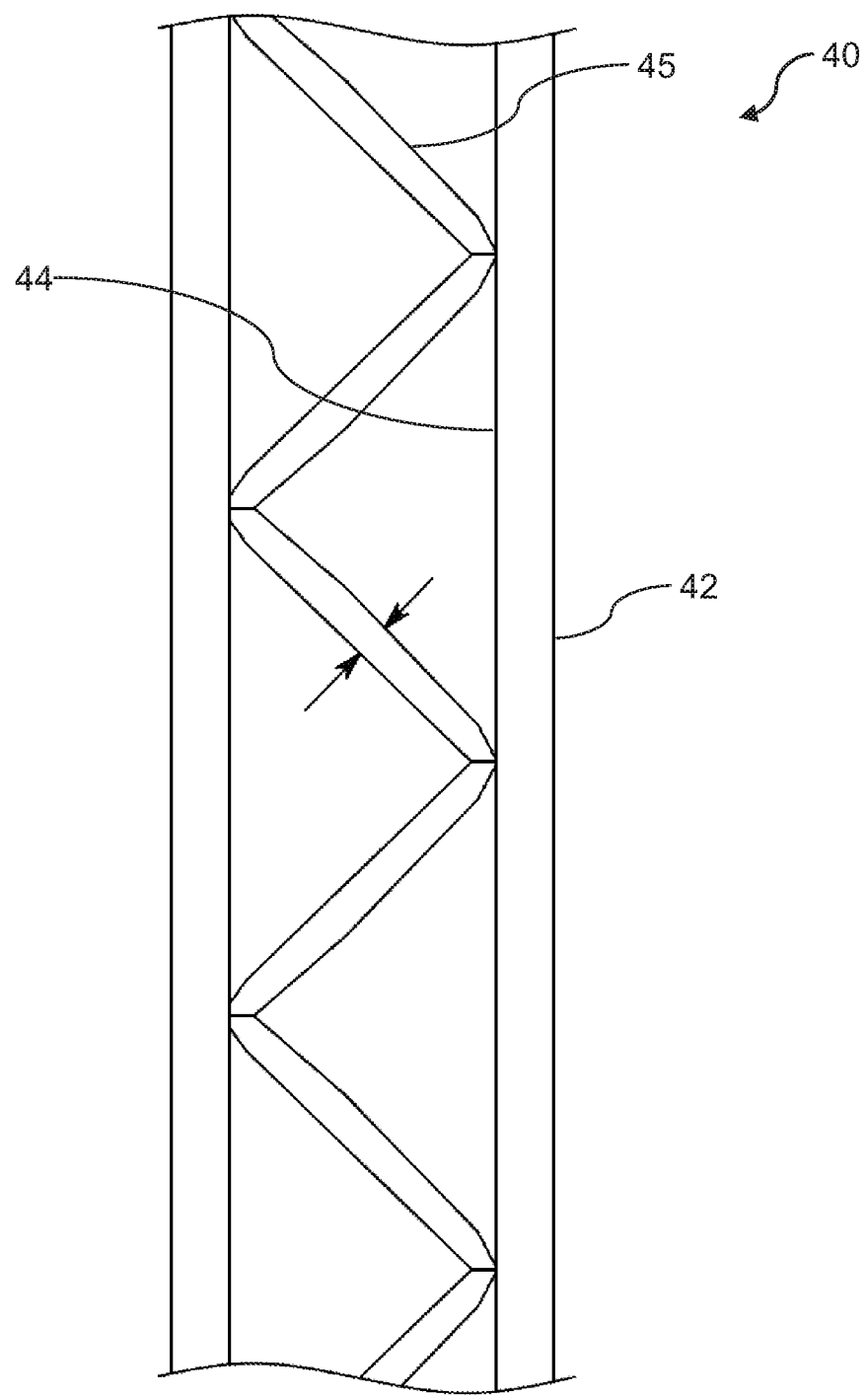
FIG. 4 is a rear view of part of the crossbar including exemplary ribs extending therein.

FIG. 4 is a rear view of part of the crossbar structure 40 including the exemplary ribs 45 extending therein. As described above, the ribs 45 of the present embodiment can extend along the hollow interior of the crossbar structure 40. Specifically, the ribs 45 can be configured to alternate between opposing sides of the crossbar inner surface 42, and be angled therefrom to form a zig-zag pattern along the direction of elongation of the crossbar structure 40. A sidewall thickness of the crossbar structure 40 between the crossbar inner surface 42 and a crossbar outer surface 44 can be relatively thin, however other embodiments may have increased sidewall thickness for more structural rigidity. The ribs 45 may additionally have a prescribed thickness to provide enhanced structural characteristics without adding unnecessary weight or complexity to the crossbar structures 40.

Figure 5:
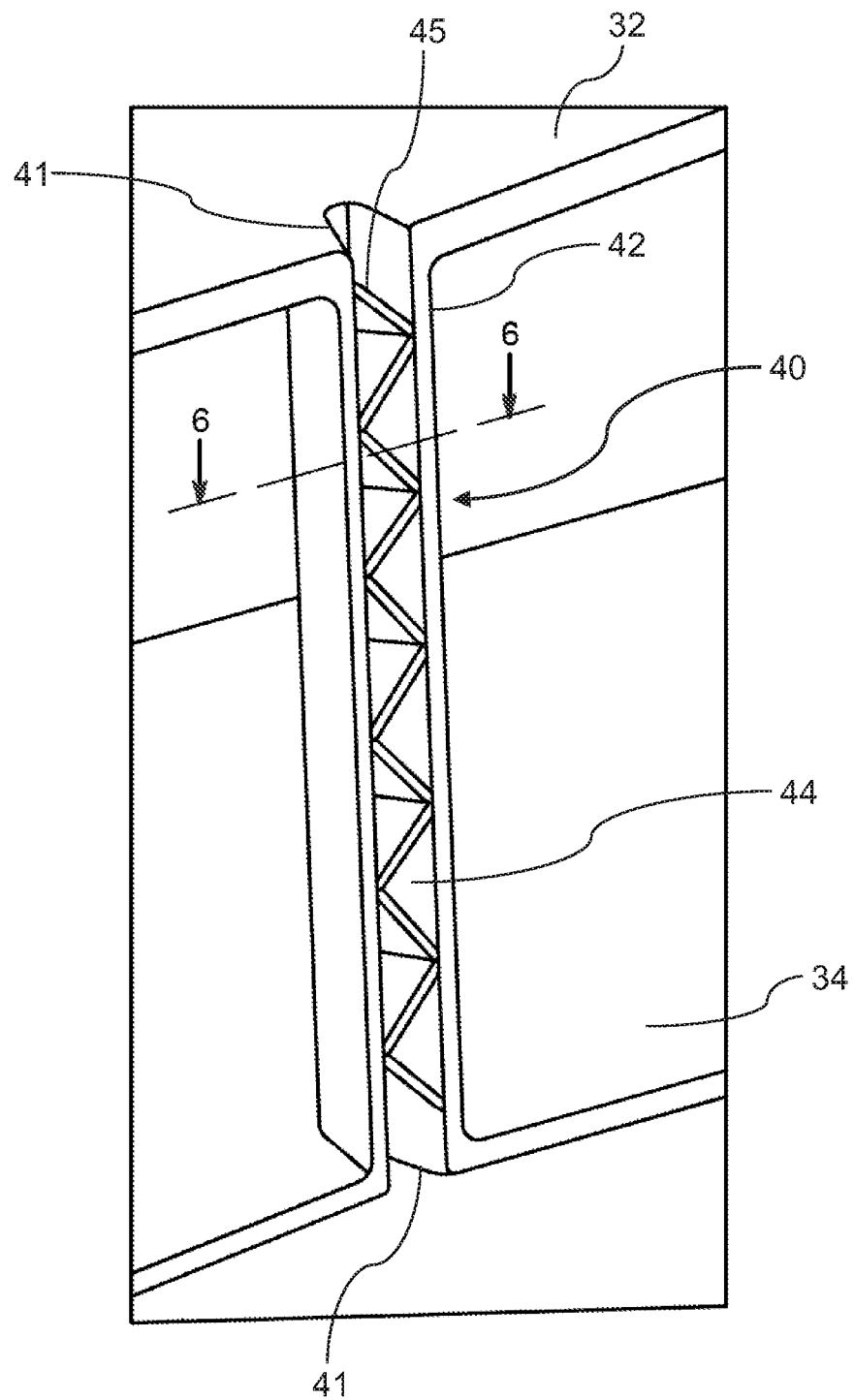
FIG. 5 is a perspective rear view of the exemplary crossbar with ribs in accordance with the disclosed subject matter.

FIG. 5 is a perspective rear view of the exemplary crossbar structures 40 with the ribs 45 in accordance with the disclosed subject matter. As shown in FIG. 5, a rear face of the crossbar structure 40 can be open to the hollow interior so as to expose the ribs 45 extending therein. On the other hand, the crossbar outer surface 44 can extend around a front face of the crossbar structure 40 to enhance aerodynamic performance and aeroacoustics of the vehicle 11.

The present embodiment of the crossbar structure 40 can include crossbar cutouts 41 at each end thereof such that the hollow interior extends through portions of the upper and lower dam portions 32,24. The ribs 45 can therefore be configured to be disposed between the crossbar cutouts 41 so as to be disposed entirely within the respective crossbar structure 40. However, alternative embodiments can be configured such that the ribs 45 extend beyond the crossbar cutouts 41. The ribs 45 of the present embodiment can also be configured as alternating and angled planar extensions between opposing sides of the crossbar inner surface. The ribs 45 may thereby form triangular compartments within the crossbar structure 40 between adjacent ribs. In alternate embodiments, the ribs 45 can be configured to extend through the hollow interior in a manner other than a zig-zag pattern, such as in a diamond or circular configuration, for example.

Figure 6:
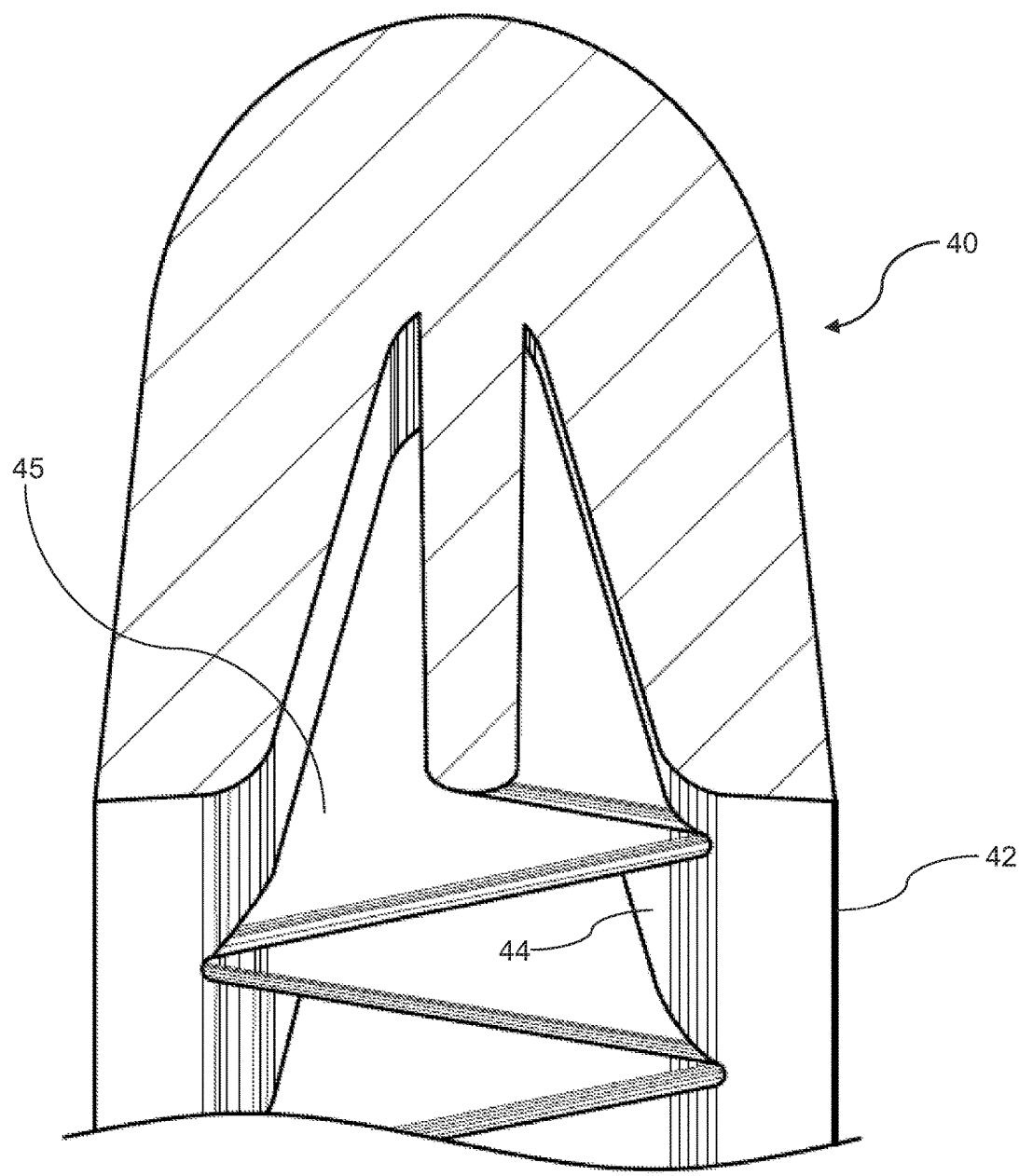
FIG. 6 is a perspective cross-section view of the exemplary crossbar of FIG. 5.

FIG. 6 is a perspective cross-section view of the exemplary crossbar structure 40 of FIG. 5. As described above and shown in FIG. 6, the crossbar structure 40 of the present embodiment can include the hollow interior with the ribs 45 extending between opposing portions of the crossbar inner surface 42. The ribs 45 can further be configured to be alternating and angled from the crossbar inner surface 42 in a zig-zag pattern as shown. A forward portion of each of the ribs 45 can extend to a portion of the crossbar inner surface 42 proximate the front face of the crossbar structure 40. Furthermore, the ribs 45 can have narrowing widths along a direction of elongation from the rear face of the crossbar structure 40 to the front face as the crossbar inner surface 42 becomes spaced farther inward from the crossbar outer surface 44. The ribs 45 of the present embodiment are configured to be flush with the rear face of the crossbar structure 40. However, as described below and shown in FIGS. 7-10, the ribs 45 in some embodiments may extend beyond the rear face of the respective crossbar structures 40.

Figure 7:
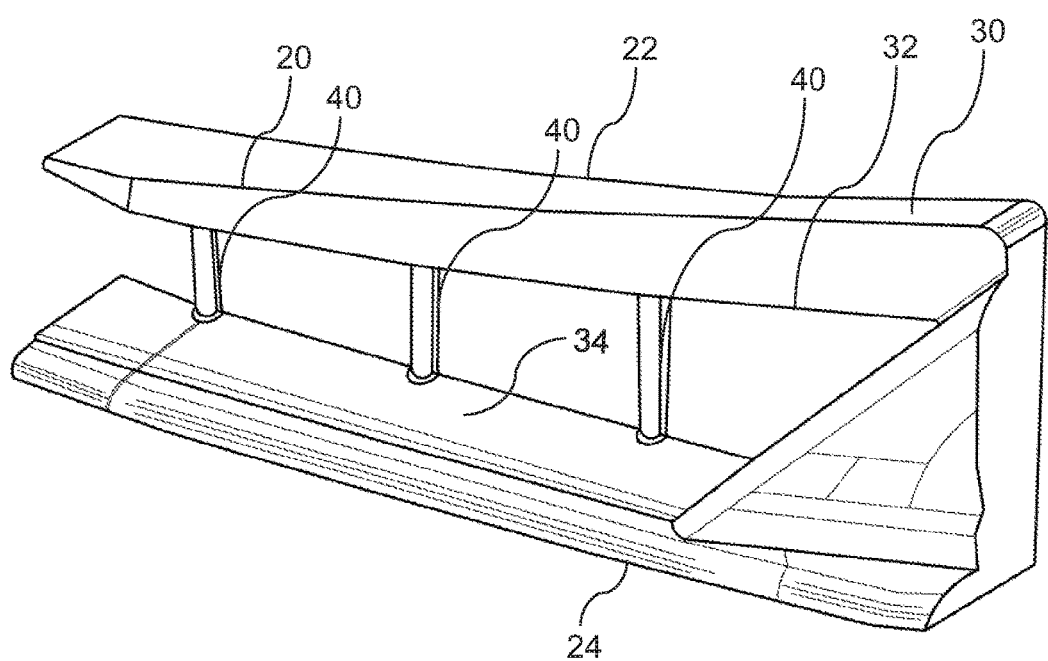
FIG. 7 is a perspective view of a front part of an alternative embodiment of the front bumper assembly including crossbars.

FIG. 7 is a perspective view of a front part of an alternative embodiment of the front bumper assembly 20 including crossbars. The front bumper assembly 20 shown in FIG. 7 is configured to include a plurality of the crossbar structures 40 extending across the air dam 30. Specifically, the crossbar structures 40 extend between the upper and lower dam portions 32,34. As will be described below, the crossbar structures 40 of the alternate embodiment can be configured to include the alternating and angled ribs 45 extending therebetween.

Figure 8:
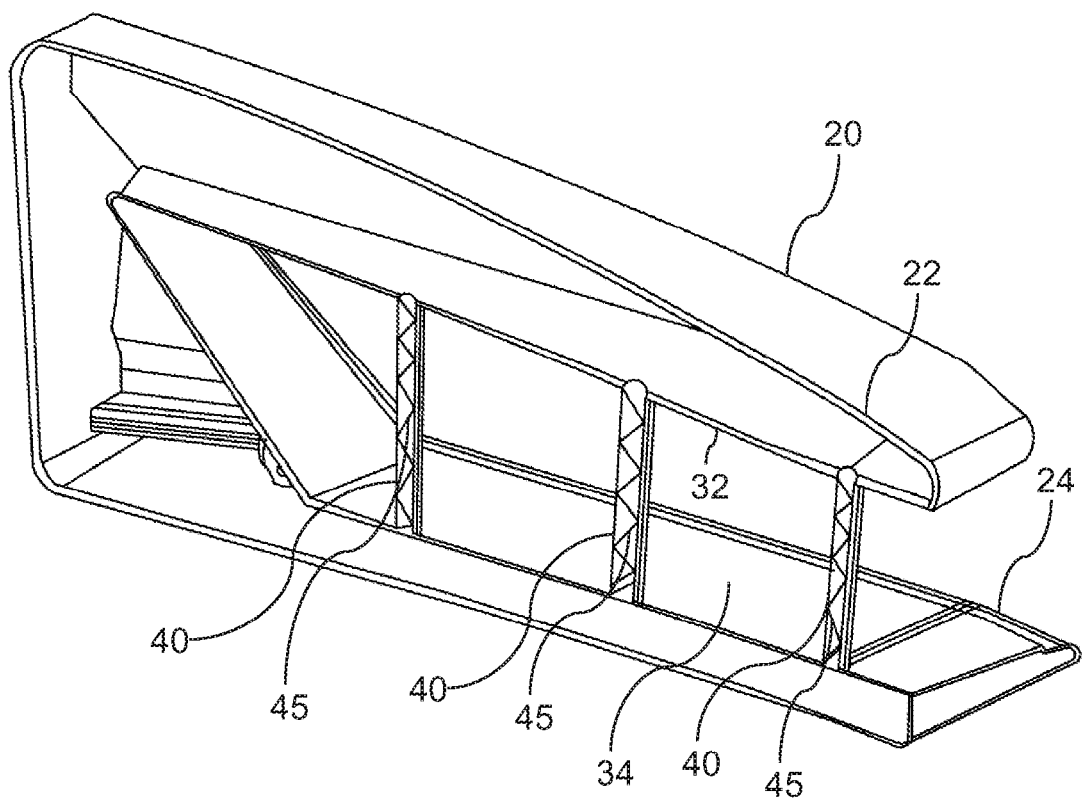
FIG. 8 is a perspective view of a rear part of the alternative embodiment of the front bumper assembly with crossbars.

FIG. 8 is a perspective view of a rear part of the alternative embodiment of the front bumper assembly 20 with the crossbar structures 40. The crossbar structures 40 shown in FIG. 8 can each include the ribs 45 extending within hollow interiors thereof, the ribs 45 of the alternate embodiment configured to extend rearward beyond the rear face of the respective cross bar structure 40. Thus, the ribs 45 may extend past both the crossbar inner surface 42 and the crossbar outer surface 44, as shown in more detail in FIG. 9.

Figure 9:
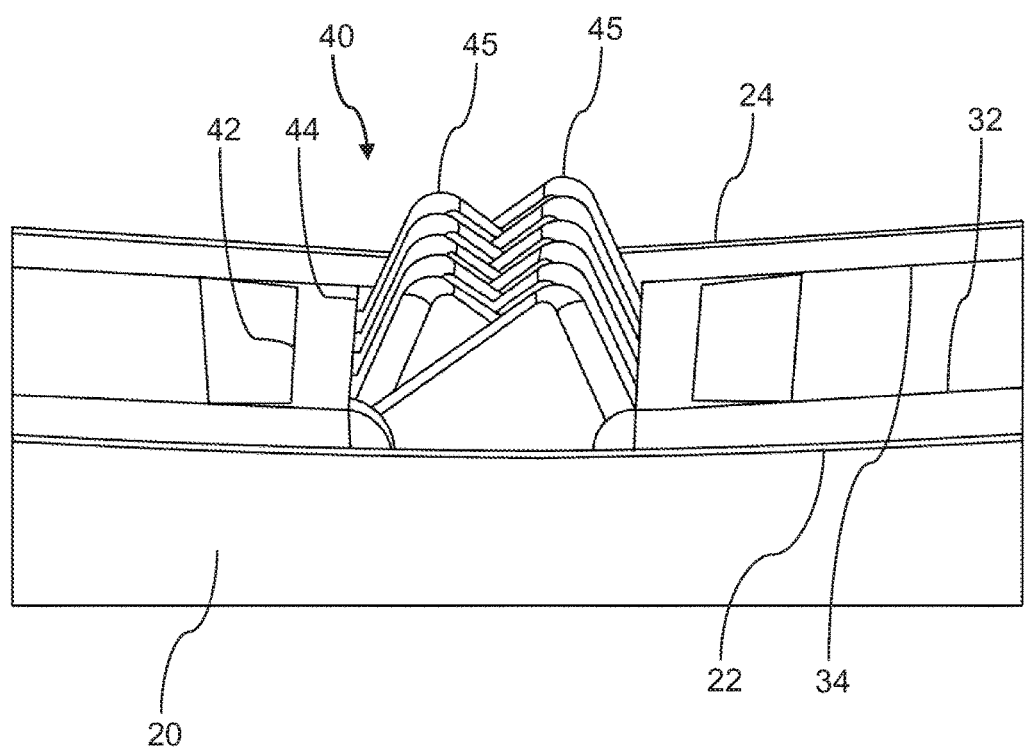
FIG. 9 is a perspective view of a top of the crossbar of the alternative embodiment of the front bumper assembly, including ribs extending through the crossbar.

FIG. 9 is a perspective view of a top of the crossbar structure 40 of the alternative embodiment of the front bumper assembly 20, including the ribs 45 extending therethrough. The ribs 45 shown in FIG. 9 are configured to extend beyond the rear face of the crossbar structure 40, as described above. In the alternate embodiment shown, the ribs 45 may be configured as shark-tooth shaped braces protruding from the hollow interior of the crossbar structure 40 such that each of the ribs 45 may be approximately triangular with a protruding point. The ribs 45 of the alternate embodiment shown may also extend in an alternating fashion such that a rearmost vertex of each of the ribs 45 disposed rearward of the rear face of the crossbar structure 40 can be disposed proximate opposing sides of the crossbar inner surface 42. Thus, for example, the uppermost of the ribs 45 is shown proximate an opposing side of the crossbar inner surface 42 from a next consecutive one of the ribs 45. The effect of the aforementioned configuration can be alternating and angled braces.

In the alternate embodiment shown in FIG. 9, the ribs 45 are configured so as to extend beyond the rear face of the crossbar structures 40 a distance less than that which would produce negative aeroacoustics, such as whistling from airflow passing through the air dam 30 and around the crossbar structures 40 when the vehicle 11 is in forward motion. Additionally, the ribs 45 of the alternate embodiment are configured so as to maintain aesthetics when viewed from a position forward of the front bumper assembly 20, and specifically the air dam 30.

Figure 10:
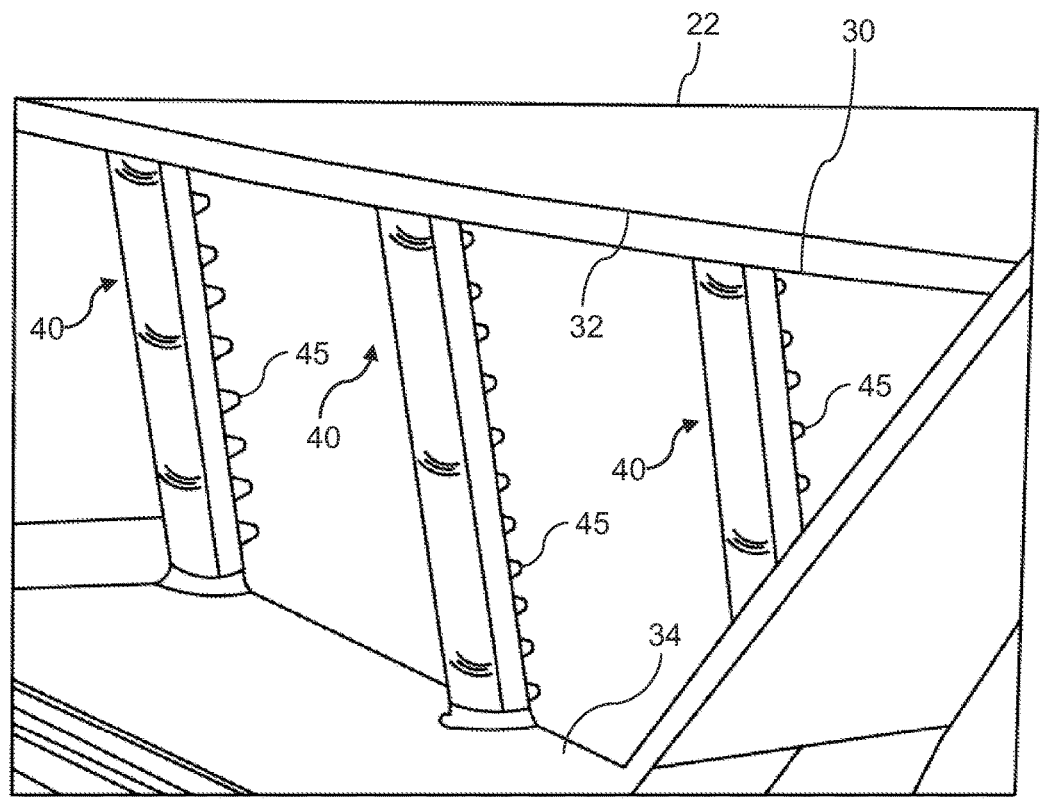
FIG. 10 is a perspective view of part of the alternative embodiment of the front bumper assembly with crossbars having ribs.

FIG. 10 is a perspective view of part of the alternative embodiment of the front bumper assembly 20 with the crossbar structures 40 including the ribs 45 extending therein. As shown in FIG. 10, the ribs 45 of the alternate embodiment shown extend beyond the rear face of the respective crossbar structures 40. However, the ribs 45 can be configured so as not to extend past the specified distance from the rear face so as to maintain aesthetics and aeroacoustics of the air dam 30. Furthermore, the ribs 45 may be configured to extend rearward within confines of the crossbar outer surfaces 44 such that the ribs 45 to not extend sideways past the crossbar outer surfaces 44.

III. Alternative Embodiments

While certain embodiments of the invention are described above, and FIGS. 1-10 disclose the best mode for practicing the various inventive aspects, it should be understood that the invention can be embodied and configured in many different ways without departing from the spirit and scope of the invention.

For example, embodiments are disclosed above in the context of the crossbar structures 40 extending across the air dam 30 of the front bumper assembly 20 as shown in FIGS. 1-10. However, embodiments are intended to include or otherwise cover a crossbar structure configured for bracing any exterior intake for reinforcing structural rigidity, as well as directing airflow and providing enhanced aesthetics, as disclosed above.

In at least one of the present embodiments, the front bumper assembly 20 can be configured to include five crossbar structures 40 extending across the air dam 30 to disrupt symmetric airflow when the vehicle is traveling in the forward direction. However, embodiments may be configured to include any number of the crossbar structures 40 appropriate to desired airflow disruption while enhancing aesthetics and aeroacoustics of the front bumper assembly 20. For instance, the front bumper assembly 20 may include one, two, three, four, five, etc. of the crossbar structures 40.

In fact, in some embodiments, the crossbar structures 40 of the exemplary vehicle 11 can be configured to extend across openings of other panels on the body 12 besides the front bumper assembly 20, such as the hood, front fenders, roof, doors, side mirrors, C-pillars, rear fenders, and rear hatch, and rear bumper assembly. As described above, the openings in other panels may constitute exterior intakes and have any appropriate number of the crossbar structures 40 extending across them.

Furthermore, the crossbar structures 40 described in the present embodiments may alternatively include ribs 45 extending in aligned patterns rather than alternating and angled orientations. For instance, the ribs 45 may extend horizontally so as to be approximately perpendicular to the crossbar inner surface 42 from which they extend. Alternatively, the ribs 45 can extend in an alternating and angled manner from the crossbar inner surface 42 in pairs such that at least two adjacent ribs 45 extend in parallel between opposing sides as described above.

All or some of the alternative structures disclosed above with regard to the crossbar structures 40 of automobiles, specifically high-performance cars, also apply to other vehicular applications. The above alternative configurations of the crossbar structures 40 are merely provided for exemplary purposes, and as indicated above, embodiments are intended to cover any type of brace extending across an opening of an exterior intake configured that operate or otherwise perform as disclosed above.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the crossbar structures disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A crossbar structure for use with a vehicle having a front bumper assembly, the crossbar structure being configured to extend across an opening in the front bumper assembly, the crossbar structure comprising:
   a hollow bar having a front face, a rear face, and opposing first and second inner surfaces, the hollow bar being configured to extend across the opening; and
   ribs extending between the opposing first and second inner surfaces of the hollow bar, the ribs being angled along a direction of elongation of the hollow bar and exposed from the rear face thereof,
   wherein the ribs comprise a first rib extending from the first inner surface of the hollow bar to the second inner surface of the hollow bar at a first angle relative to the direction of elongation of the hollow bar and a second rib extending from the second inner surface of the hollow bar to the first inner surface of the hollow bar at a second angle relative to the direction of elongation of the hollow bar, the first angle being different than the second angle.

2. The crossbar structure according to claim 1, wherein the ribs are configured to extend in an alternating manner so as to form a zig-zag pattern within the hollow bar.

3. The crossbar structure according to claim 2, wherein the ribs are configured to form triangular spaces therebetween within the hollow bar.

4. The crossbar structure according to claim 1, wherein the ribs are configured to terminate between opposing ends of the hollow bar.

5. The crossbar structure according to claim 1, wherein the ribs are configured to be flush with the rear face of the hollow bar.

6. The crossbar structure according to claim 1, wherein the ribs are configured to extend rearward beyond the rear face of the hollow bar.

7. The crossbar structure according to claim 6, wherein portions of the ribs extending beyond the rear face of the hollow bar are configured as approximately triangular extensions.

8. The crossbar structure according to claim 7, wherein the portions of the ribs extend toward alternating sides of the rear face.

9. The crossbar structure according to claim 1, wherein the ribs are configured with sufficient thickness so as to impede deformation of the front face of the hollow bar from airflow passing across the hollow bar when the vehicle is moving in a forward direction of travel.

10. The crossbar structure according to claim 9, wherein the ribs are configured to disrupt airflow passing across the hollow bar so as to impede whistle-like sounds thereof.

11. A front bumper assembly of a vehicle, the front bumper assembly comprising:
    at least one opening configured as an exterior intake to accept passage of airflow therethrough; and
    at least one crossbar structure extending across the opening, the at least one crossbar structure including:
    a hollow bar having a front face, a rear face, and opposing first and second inner surfaces, the hollow bar being configured to extend across the opening; and
    ribs extending between the opposing first and second inner surfaces of the hollow bar, the ribs being angled along a direction of elongation of the hollow bar and exposed from the rear face thereof,
    wherein the ribs comprise a first rib extending from the first inner surface of the hollow bar to the second inner surface of the hollow bar at a first angle relative to the direction of elongation of the hollow bar and a second rib extending from the second inner surface of the hollow bar to the first inner surface of the hollow bar at a second angle relative to the direction of elongation of the hollow bar, the first angle being different than the second angle.

12. The front bumper assembly according to claim 11, wherein the ribs are configured to extend in an alternating manner so as to form a zig-zag pattern within the hollow bar.

13. The front bumper assembly according to claim 12, wherein the ribs are configured to form triangular spaces therebetween within the hollow bar.

14. The front bumper assembly according to claim 11, wherein the ribs are configured to terminate between opposing ends of the hollow bar.

15. The front bumper assembly according to claim 11, wherein the ribs are configured to be flush with the rear face of the hollow bar.

16. The front bumper assembly according to claim 11, wherein the ribs are configured to extend rearward beyond the rear face of the hollow bar.

17. The front bumper assembly according to claim 16, wherein portions of the ribs extending beyond the rear face of the hollow bar are configured as approximately triangular extensions.

18. The front bumper assembly according to claim 17, wherein the portions of the ribs extend toward alternating sides of the rear face.

19. The front bumper assembly according to claim 11, wherein the ribs are configured with sufficient thickness so as to impede deformation of the front face of the hollow bar from airflow passing across the hollow bar so as to impede whistle-like sounds thereof when the vehicle is moving in a forward direction of travel.

20. A method of forming a crossbar structure for use with a vehicle having a front bumper assembly, the crossbar structure being configured to extend across an opening in the front bumper assembly, the method comprising:
- providing a hollow bar having a front face, a rear face, and opposing first and second inner surfaces;
- configuring the hollow bar to extend across the opening; and
- forming ribs to extend between the opposing first and second inner surfaces of the hollow bar so as to be angled along a direction of elongation of the hollow bar and exposed from the rear face thereof,
- wherein the ribs comprise a first rib extending from the first inner surface of the hollow bar to the second inner surface of the hollow bar at a first angle relative to the direction of elongation of the hollow bar and a second rib extending from the second inner surface of the hollow bar to the first inner surface of the hollow bar at a second angle relative to the direction of elongation of the hollow bar, the first angle being different than the second angle.

* * * * *